United States Patent
Laaksonen et al.

(10) Patent No.: US 10,219,092 B2
(45) Date of Patent: Feb. 26, 2019

(54) SPATIAL RENDERING OF A MESSAGE

(71) Applicant: Nokia Technologies Oy, Espoo (FI)

(72) Inventors: Lasse Laaksonen, Tampere (FI); Miikka Vilermo, Siuro (FI); Mikko Tammi, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/819,237

(22) Filed: Nov. 21, 2017

(65) Prior Publication Data

US 2018/0146316 A1    May 24, 2018

(30) Foreign Application Priority Data

Nov. 23, 2016   (EP) .................................. 16200140

(51) Int. Cl.
| | | |
|---|---|---|
| *H04S 5/00* | (2006.01) | |
| *G06T 19/20* | (2011.01) | |
| *H04R 1/40* | (2006.01) | |
| *H04R 27/00* | (2006.01) | |

(52) U.S. Cl.
CPC ............... *H04S 5/00* (2013.01); *G06T 19/20* (2013.01); *H04R 1/403* (2013.01); *H04R 27/00* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 5,521,981 A | 5/1996 | Gehring | |
| 6,329,908 B1 | 12/2001 | Frecska | |
| 2003/0223603 A1 | 12/2003 | Beckman | |
| 2016/0350973 A1* | 12/2016 | Shapira | ................ G06T 19/006 |

FOREIGN PATENT DOCUMENTS

| | | |
|---|---|---|
| EP | 1415508 A2 | 5/2004 |
| EP | 2891955 A1 | 7/2015 |
| GB | 2496588 A | 5/2013 |
| JP | 2000-036993 A | 2/2000 |
| WO | 2003/015471 A2 | 2/2003 |

OTHER PUBLICATIONS

Extended European Search Report received for corresponding European Patent Application No. 16200140.8, dated Feb. 10, 2017, 9 pages.

\* cited by examiner

*Primary Examiner* — Peter Hoang
(74) *Attorney, Agent, or Firm* — Harrington & Smith

(57) ABSTRACT

A method comprising: causing targeting of a message to a first sub-set of users that receive messages, wherein the message is not targeted to a second sub-set of users that receive messages; and causing different spatial rendering of the message to the first sub-set of users compared to the second sub-set of users.

20 Claims, 4 Drawing Sheets

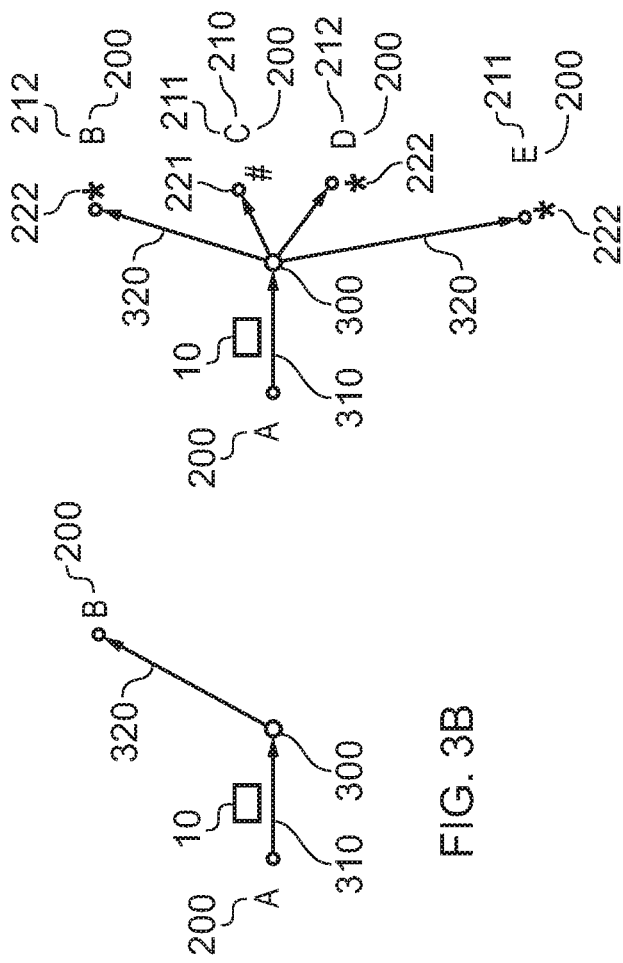
FIG. 3C
FIG. 3B
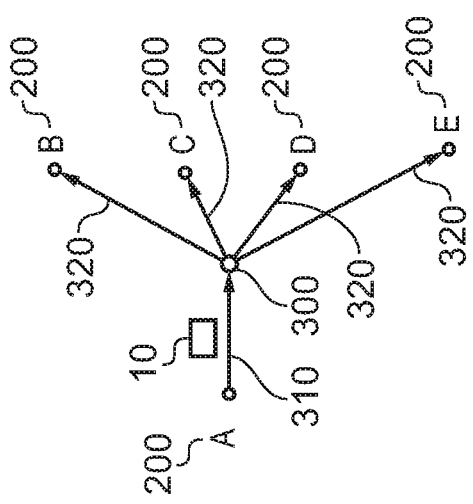
FIG. 3A

SPATIAL RENDERING OF A MESSAGE

TECHNOLOGICAL FIELD

Embodiments of the present invention relate to spatial rendering of a message. In particular, they relate to spatial rendering of an audio message as a sound object or a visual message as a visual object.

BACKGROUND

Spatial rendering is a rendering technique that renders content as an object at a particular three dimensional position within a three dimensional space.

For example, using mediated reality such as virtual reality, it is possible to position a visual object in a three-dimensional visual space. The position of the visual object may be controlled and changed.

In spatial audio rendering, audio may be rendered as a sound object that has a three-dimensional position in a three-dimensional sound space. Various different spatial audio rendering techniques are available. For example, a head-related transfer function may be used for spatial audio rendering in a binaural format or amplitude panning may be used for spatial audio rendering using loudspeakers. It is possible to control not only the position of an audio object but it is also possible to control the spatial extent of an audio object by distributing the audio object across multiple different spatial channels that divide space into distinct sectors, for example, defined by different combinations of azimuthal and polar angles if spherical co-ordinates. In some examples, this spatial distribution may be achieved by dividing the audio object into different spectral channels and placing each different spectral channel into a different spatial channel.

BRIEF SUMMARY

According to various, but not necessarily all, embodiments of the invention there is provided method comprising: causing targeting of a message to a first sub-set of users that receive messages, wherein the message is not targeted to a second sub-set of users that receive messages; and causing different spatial rendering of the message to the first sub-set of users compared to the second sub-set of users.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 3A, 3B and 3C illustrate the rendering of a message;

DETAILED DESCRIPTION

Figure 1:
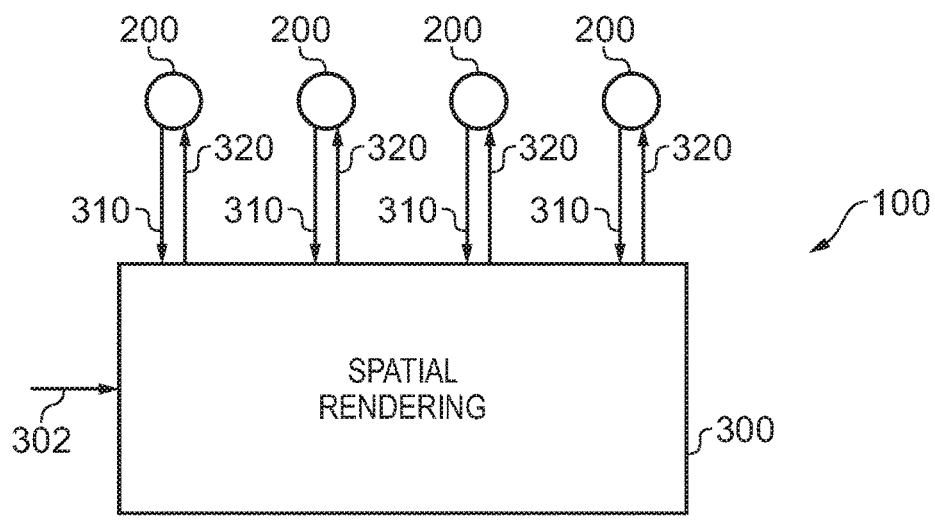
FIG. 1 illustrates an example of a spatial rendering system.

FIG. 1 illustrates an example of a multiuser rendering system 100 comprising a spatial rendering system 300. The spatial rendering system 300 is configured to provide a message 10 simultaneously to multiple users 200 via different output communication channels 320. The spatial rendering system 300 is configured to control spatial rendering of the message 10 via each of the output communication channels 320. The spatial rendering via each communication channel 320 to each user 200, may be different.

The spatial rendering may be local for the users. In some examples, each user has a local, personal three-dimensional space in which rendering occurs. In some other, some or all users share a three-dimensional space in which rendering occurs.

For example, the message 10 may be rendered as an object at a three-dimensional position within a three-dimensional space by the spatial rendering system 300. The spatial rendering system 300 may, for example, control the three-dimensional position of the object when rendered within the three-dimensional space and/or may control a spatial extent of an object when rendered in the three-dimensional space. In this way, it is possible for the spatial rendering system 300 to spatial render the message 10 to each of the users 200 in a different way.

In this example, a control input 302 is illustrated. The control input 302 may, for example, indicate a target 210 for the message 10. The control input 302 may be provided by a user 200 who composes the message 10 and sends the message 10 to the spatial rendering system 300 via an input communication channel 310. In other examples, the target 210 may be automatically selected, for example, based on the content of the message 10 or on some other criteria.

The message 10 may be simultaneously rendered to the users 200. At least some of the users 200 may be in different locations such that they cannot see and/or hear each other through face-to-face communication. In some examples, the message 10 is rendered to a user via a head-mounted device. In some examples, the head-mounted device may be a head-mounted display configured to enable virtual reality for the user 200 and/or in some examples, the head-mounted device may be headphones configured to provide spatial audio rendering to the user 200.

The spatial rendering system 300 is configured to control what is spatially rendered, to whom it is spatially rendered, where it is spatially rendered in the three-dimensional space and how it is rendered. It should be appreciated that one or more of these parameters may be different for different users.

Figure 2:
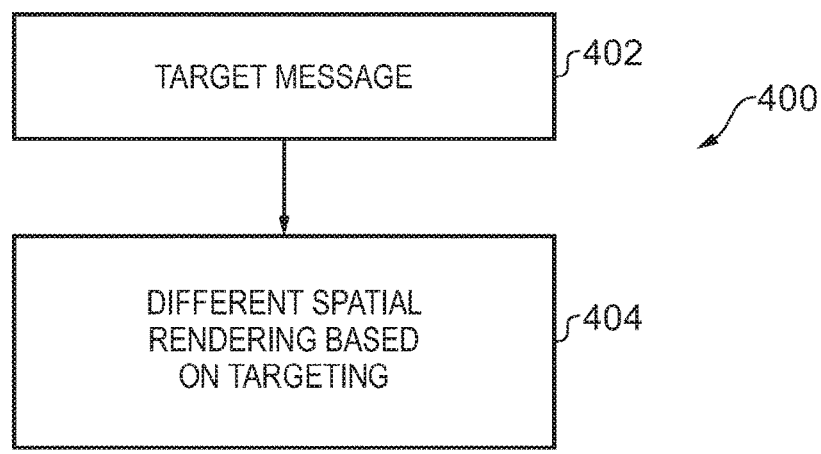
FIG. 2 illustrates an example of a method.

FIG. 2 illustrates a method 400 for controlling spatial rendering of the message 10.

At block 402, the method 400 comprises targeting 210 a message 10 to a first sub-set 211 of users 200 capable of receiving messages, wherein the message 10 is not targeted to a second sub-set 212 of users 200 capable of receiving messages.

At block 404 of the method 400, the method causes different spatial rendering 221, 222 of the message 10 to the first sub-set 211 of users 200 compared to the second sub-set 212 of users 200.

FIG. 3A illustrates an example of the spatial rendering system 300 receiving a message 10 from a user A via an input communication channel 310. In this example, the message 10 is rendered to the users B, C, D and E via output communication channels 320.

FIG. 3B illustrates that the spatial rendering system 300 may be selective in the rendering of the message 10. In this example, the message 10 is only rendered to the user B.

FIG. 3C illustrates that the spatial rendering system 300 may cause different spatial rendering 221, 222 of the message 10 to a first sub-set 211 of users 200 compared to a second sub-set 212 of users 200.

In this example, the message 10 is received from the user A via an input communication channel 310 and the spatial rendering system 300 provides the message 10 to each of the users B, C, D and E. The spatial rendering system 300 controls different spatial rendering of the message 10 to the first sub-set 211 of users 200 who have been targeted compared to the second sub-set 212 of users 200 who have not been targeted. The message 10 is targeted to the first sub-set 211 of users 200 and the message 10 is rendered with first spatial rendering characteristics 221 to the first sub-set 211 of users 200. The message 10 is rendered with different second spatial rendering characteristics 222 to the second sub-set 212 of users 200. In the illustrated example, the message 10 is targeted to the user C and the message is rendered to the user C with the first spatial rendering characteristics 221 (#). Whereas the message 10 is spatially rendered to the users B, D, E with second spatial rendering characteristics 222 (*).

In this example user 200 (A) who composes the message 10 also provides a control input 302 that indicates a target 210 for the message 200, for example, as metadata associated with the message 10 or separately via a human machine interface. The user 200 (A) sends the message 10 to the spatial rendering system 300 via an input communication channel 310. In other examples, the target 210 may be automatically selected, for example, by the spatial rendering system 300 based on the content of a message 10 sent 10 to the spatial rendering system 300 via an input communication channel 310 or on some other criteria.

In one embodiment, it may be desirable to render the message 10 to the first sub-set 211 of users 200 such that the first sub-set 211 of users 200 know that the message 10 has been targeted 210 to them and it may also be desirable to render the message 10 to the second sub-set 212 of users 200 such that the second sub-set 212 of users 200 do not know that the message 10 has been targeted 210 to other users.

For example, the message 10 is spatially rendered to the second sub-set 212 of users 200 using second spatial rendering characteristics 222 that define a default position for the message 10. The message 10 is spatially rendered to the first sub-set 211 of users 200 using first spatial rendering characteristics 221 that define a position for the message 10 that is not the default position. The default position may, for example, be an actual relative position of a user in the rendered space and the non-default position may be at a different position, for example a central position.

The action of targeting 210 a message 10 towards a first sub-set 211 of users 200 causes a change in the spatial rendering characteristics for the first sub-set 211 of users 200 from the second (default) spatial rendering characteristics 222 to the first (non-default) spatial rendering characteristics 221.

In a second embodiment, it may be desirable for the first sub-set 211 of users 200 not to know that the message 10 has been targeted to them and it may also be desirable to render the message 10 to the second sub-set 212 of users 200 such that the second sub-set 212 of users 200 do not know that the message 10 has been targeted 210 to other users.

In this case, the spatial rendering of the message 10 to the first sub-set 211 of users 200 does not indicate to the first sub-set 211 of users 200 that the message 10 is targeted to them and the spatial rendering of the message 10 to the second sub-set 212 of users 200 does indicate to the second sub-set 212 of users 200 that the message 10 is not targeted to them.

For example, the message 10 may be spatially rendered to the first sub-set 211 of users 200 using first spatial rendering characteristics 221 that define a default position for the message 10. The message 10 is spatially rendered to the second sub-set 212 of users 200 using second spatial rendering characteristics 222 that define a non-default position for the message 10. In this example, it will therefore be appreciated that the targeting of the first sub-set 211 of users 200 does not necessarily have any effect on how information (the message 10) is rendered to the first sub-set 211 of users 200. The message 10 is rendered where it would be expected to be rendered at the default position.

In other examples of the second embodiment, it may be possible or desirable to modify the position or some other spatial rendering characteristic used to render the message 10 such that the first sub-set 211 of users 200 know that the message 10 has been targeted to them while the second sub-set 212 of users 200 also know, by the spatial rendering of the message to them, that the message 10 has been targeted to the first sub-set 211 of users 200.

Figure 4A:
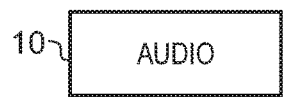
FIGS. 4A and 4B illustrate different types of messages.

FIG. 4A illustrates an example of a message 10. In this example, the message 10 is an audio message. The audio message 10 may define a spatial sound object within a sound space. It may, for example, define not only the audio content of the sound object but also its spatial rendering characteristics such as the three-dimensional position at which it should be rendered and, possibly, the spatial extent of the sound object when it is rendered. The spatial audio message 10 may have a number of different formats and it may not be necessary for the spatial rendering characteristics for the message 10 to be explicitly defined within the message. They may be inherently defined within the coding of the message.

Different spatial audio codecs and rendering methods are available. For example a head-related transfer function may be used for providing a binaural rendering and amplitude panning may be used for loudspeaker rendering.

Figure 4B:
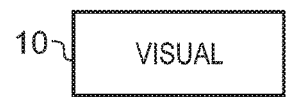

FIG. 4B illustrates an example in which the message 10 is a visual message 10. The visual message 10 may define a visual object in a visual space. A visual object is content that may be perceived through a user's vision that has a three-dimensional location within a three-dimensional space. The visual object may be spatially rendered using video or virtual reality codecs or similar.

Figure 5A:
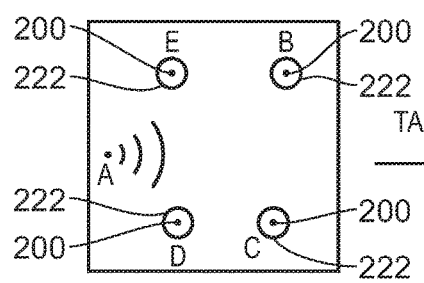
FIGS. 5A, 5B and 5C illustrate spatial rendering of a targeted message to a first sub-set of users in a manner that indicates to the first sub-set of users that the message has been targeted to them.
Figure 5B:
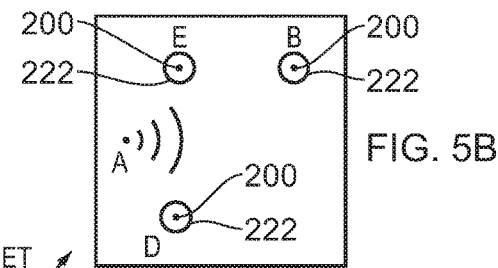
Figure 5C:
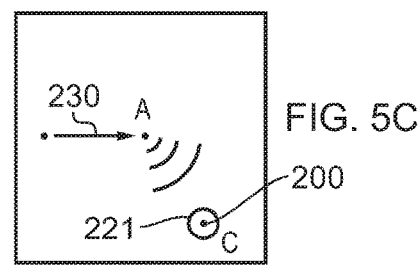

FIGS. 5A, 5B and 5C illustrate an example of spatial audio rendering in accordance with the first embodiment. The Figures illustrate a sound space as perceived by the users 200. FIG. 5A illustrates a default situation where the user A sends a message 10 to the other users B, C, D and E. The audio message 10 is rendered to the other users with default spatial audio rendering characteristics. As illustrated, the audio message 10 appears to come from a position within the sound space associated with the user A.

FIGS. 5B and 5C illustrate the consequences of targeting the message 10 to a particular user C. Different spatial audio rendering of the message 10 is used for the first sub-set 211 of users 200 (FIG. 5C) compared to the second sub-set 212 of users 200 (FIG. 5B).

In the example of FIG. 5B, the audio message 10 continues to be rendered in the same manner as illustrated in FIG. 5A. The message 10 is spatially rendered from the same location for the users B, D, E. The second spatial rendering characteristics 222 are the same as those prior to the targeting of the user C. The users B, D, E are therefore unaware that the message 10 has been targeted to the user C. There is no change in the position of the rendering of the message 10 for the users B, D, E.

In contradistinction, in FIG. 5C, there is illustrated the spatial rendering of the audio message 10 from the perspective of the user C. In this example, the position at which the audio message 10 is rendered changes from that illustrated in FIG. 5A to a new position that is no longer the default position of FIG. 5C. In this example, the new position is a central position. The change in the position at which the message 10 is rendered provides a clear indication to the user C that the message 10 is targeted to them.

The transition in the position of the message 10 from that illustrated in FIG. 5A (default position) to that illustrated in FIG. 5C (non-default position) may be a smooth or gradual transition.

Figure 6A:
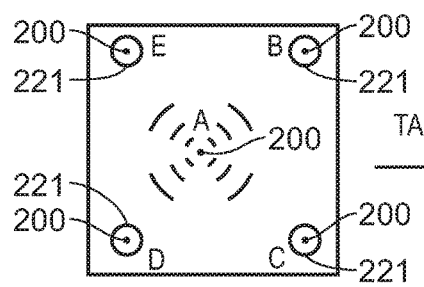
FIGS. 6A, 6B and 6C illustrate an example of spatial rendering of a message to a first sub-set of users that does not indicate to the first sub-set of users that the message is targeted to them and spatial rendering of the message to a second sub-set of users that does indicate to the second sub-set of users that the message is not targeted to them.
Figure 6B:
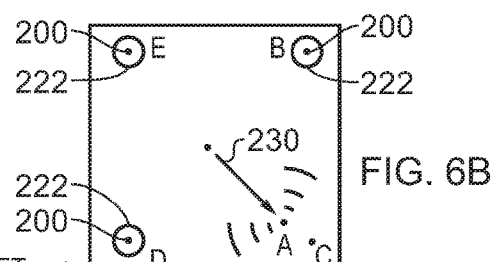
Figure 6C:
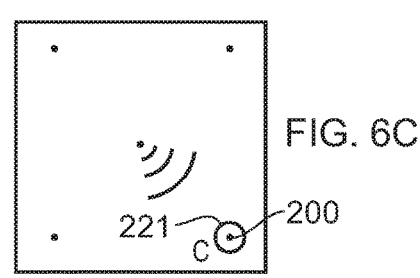

FIGS. 6A, 6B and 6C illustrate an example of the second embodiment for spatial audio rendering. As in FIG. 5A, in FIG. 6A, the audio message 10 is spatially rendered at a default position associated with the user A to the users B, C, D and E. FIG. 6A differs from FIG. 5A in that the default position at which the audio message 10 is rendered is differently located in FIG. 6A compared to FIG. 5A.

The consequences of targeting a user C are illustrated in FIGS. 6B and 6C.

In this example, the audio message 10 is spatially rendered to the targeted user C from the same default central position as illustrated in FIG. 6A. There is, therefore, no consequent change in the position from which the message 10 is spatially rendered to C as a consequence of the user C being targeted. The user C does not therefore know that they have been targeted.

In contradistinction, in FIG. 6B, the spatial rendering of the audio message 10 is changed for each of the users B, D and E. The audio message 10 is no longer spatially rendered from the default position but is now rendered from a position close to the targeted user C. The users B, D, E who have not been targeted are therefore able to recognize as a consequence of the change in position at which the message 10 is rendered that the message 10 has been targeted to a user other than themselves and they are also able to identify to whom the message 10 has been targeted because it is spatially rendered in close proximity to the user C.

If the message 10 is targeted to more than one person, then the spatial rendering of the message 10 may be close to all of the users who have been targeted. It may be, for example, positioned at a central location between the targeted users.

Although in the example of FIG. 6C, it has been described that the message 10 is spatially rendered with the default first spatial rendering characteristics as used in FIG. 6A, in other examples, the message 10 may be rendered with different spatial rendering characteristics so that the user C does therefore know that they have been targeted. For example, it may be rendered with an increased elevation.

Figures 7A, 7B, 7C:
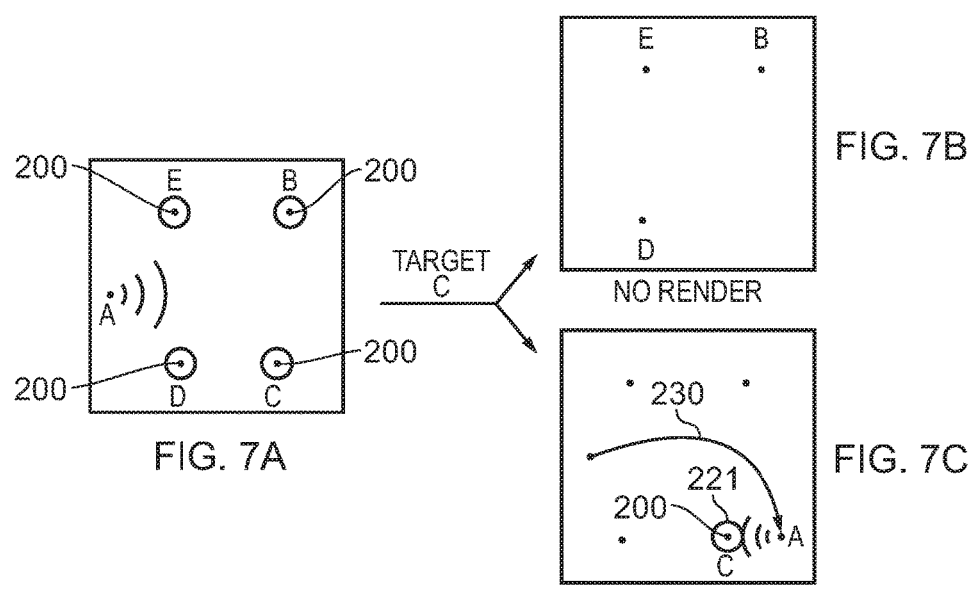
FIGS. 7A, 7B and 7C illustrate the rendering of a private message.

FIGS. 7A, 7B and 7C illustrate an example of spatial rendering of a private message 10. FIG. 7A is the same as FIG. 5A, although in an alternative embodiment it could also be rendered as in FIG. 6A.

In this example, a message 10 is designated as a private message and is targeted towards the user C.

As the message 10 is designated as private, it is not rendered at all to those users 200 who have not been targeted. There is therefore no rendering of the message 10 to the users B, D, E in FIG. 7B. There is therefore a difference in the spatial rendering of the message 10 to the first sub-set 211 of users 200 compared to the second sub-set 212 of users 200 because there is no rendering of the message 10 to the second sub-set 212 of users 200. Continuing the example, in FIG. 7C, the private message 10 is spatially rendered to the targeted user C with particular first spatial rendering characteristics that are different to those used in FIG. 7A. These first spatial rendering characteristics may be characteristics that are particular to a private message 10. In the example of FIG. 7C, the location of the user A producing the private message 10 changes to a new location beside the targeted user C and the content of the private audio message 10 is rendered with audio characteristics simulating a whisper.

It will be appreciated from the foregoing description that it is possible for messages 10 to be rendered simultaneously. The spatial rendering system 300 is, in some, but necessarily all examples, configured to prevent the simultaneous overlapping in space and time of a rendered message 10 with another rendered message 10. Such simultaneous overlapping in both space and time occurs when messages are rendered simultaneously (overlapping time) with the same or similar position (overlapping position) but does not occur when messages are rendered at the same or similar positions at distinct, separated times and does not occur when messages are rendered simultaneously (overlapping time) at different, distinct, separated positions.

Therefore, if multiple messages 10 are rendered at the same time, they are rendered with different positions and they may be rendered with a minimum spatial separation.

In some, but necessarily all examples, simultaneously rendered messages 10 may be disambiguated by using at least one (or two) different spatial rendering parameters selected from the group comprising orientation in a horizontal plane, elevation and distance.

In some, but not necessarily all examples, it may be desirable to enable a user 200 to whom a message 10 is rendered to dismiss a message 10 and prevent it being spatially rendered to that user. In these circumstances, it may be desirable for there to be a feedback message sent to the originator of the message 10 informing them that the message has not been rendered to the targeted (or other) user.

It may be desirable, in some circumstances, to have user settings that prioritize different users and dismiss or not allow the rendering of messages from lower priority users if the spatial rendering system 300 is simultaneously spatially rendering one or more messages 10 from higher priority users.

In some, but not necessarily all examples, it may be desirable to provide user settings that control the composition of messages 10 and/or the targeting of users. For example, the spatial rendering system 300 may automatically target particular users based upon content of a received message 10.

The spatial rendering system 300 may be implemented using one or more controllers 600. Implementation of a controller 600 may be as controller circuitry. The controller 600 may be implemented in hardware alone, have certain aspects in software including firmware alone or can be a combination of hardware and software (including firmware).

Figures 8A, 8B:
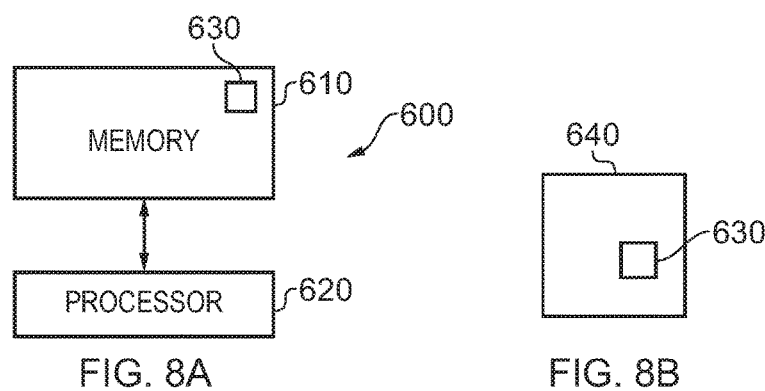
FIG. 8A illustrates an example of a controller suitable for operating as a spatial rendering system.
FIG. 8B illustrates an example of a record carrier comprising a computer program.

As illustrated in FIG. 8A the controller 600 may be implemented using instructions that enable hardware functionality, for example, by using executable instructions of a computer program 630 in a general-purpose or special-purpose processor 620 that may be stored on a computer readable storage medium (disk, memory etc) to be executed by such a processor 620.

The processor 620 is configured to read from and write to the memory 610. The processor 620 may also comprise an output interface via which data and/or commands are output by the processor 620 and an input interface via which data and/or commands are input to the processor 620.

The memory 610 stores a computer program 630 comprising computer program instructions (computer program code) that controls the operation of the apparatus 300 when loaded into the processor 620. The computer program instructions, of the computer program 630, provide the logic and routines that enables the apparatus to perform the methods illustrated in FIGS. 1 to 7. The processor 620 by reading the memory 610 is able to load and execute the computer program 630.

The apparatus 300 therefore comprises:
at least one processor 620; and
at least one memory 610 including computer program code
the at least one memory 610 and the computer program code configured to, with the at least one processor 620, cause the apparatus 300 at least to perform:
causing targeting of a message to a first sub-set of users that are available to receive messages, wherein the message is not targeted to a second sub-set of users that are available to receive messages; and
causing different spatial rendering of the message to the first sub-set of users compared to the second sub-set of users.

As illustrated in FIG. 8B, the computer program 630 may arrive at the apparatus 300 via any suitable delivery mechanism 640. The delivery mechanism 640 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 630. The delivery mechanism may be a signal configured to reliably transfer the computer program 630. The apparatus 300 may propagate or transmit the computer program 630 as a computer data signal.

Although the memory 610 is illustrated as a single component/circuitry it may be implemented as one or more separate components/circuitry some or all of which may be integrated/removable and/or may provide permanent/semi-permanent/dynamic/cached storage.

Although the processor 620 is illustrated as a single component/circuitry it may be implemented as one or more separate components/circuitry some or all of which may be integrated/removable. The processor 620 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1 to 7 may represent steps in a method and/or sections of code in the computer program 630. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is, any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising:
   determining that a message comprising audio and/or visual content, from a first user in a virtual three-dimensional space, is targeted to a first sub-set of users in the virtual three-dimensional space, wherein the message is not targeted to a second sub-set of users in the virtual three-dimensional space;
   determining a first audio and/or visual object and a second audio and/or visual object, wherein the first audio and/or visual object comprises the audio and/or visual content of the message and one or more first values for one or more first spatial rendering parameters, and the second audio and/or visual object comprises the audio and/or visual content of the message and one or more second values for one or more second spatial rendering parameters;
   causing the first audio and/or visual object to be rendered to the first sub-set of users based on the first values such that the audio and/or visual content is rendered at a first position in the virtual three-dimensional space; and
   causing the second audio and/or visual object to be rendered to the second sub-set of users based on the one or more second values such that the audio and/or visual content is rendered at a different, second position in the virtual three-dimensional space.

2. A method as claimed in claim 1, wherein at least one of:
   the audio and/or visual content comprises audio content to be rendered within a sound space of the virtual three-dimensional space based on the respective first audio and/or visual object and the second audio and/or visual object; and
   the audio and/or visual content comprises visual content to be rendered within a visual space of the virtual three-dimensional space based on the respective first audio and/or visual object and the second audio and/or visual object.

3. A method as claimed in claim 1, wherein at least one of the first values and at least one of the second values are different values for a same spatial rendering parameter, wherein the same spatial rendering parameter corresponds to at least one of: two-dimensional orientation, elevation, distance and spatial extent.

4. A method as claimed in claim 1, wherein the message is caused to be targeted to the first sub-set of users by the first user who has composed the message.

5. A method as claimed in claim 1, wherein causing the first audio and/or visual object to be rendered to the first sub-set of users and the second audio and/or visual object to be rendered to the second sub-set of users provides indirect selective communication to the users via the first values and the second values, separate to any content of the message.

6. A method as claimed in claim 1, wherein rendering of the first audio and/or visual object to the first sub-set of users indicates to the first sub-set of users that the message is targeted to them.

7. A method as claimed in claim 6, wherein rendering of the second audio and/or visual object to the second sub-set of users does not indicate to the second sub-set of users that the message is not targeted to them.

8. A method as claimed in claim 6, wherein the second position is at a default position and wherein the first position is not at the default position.

9. A method as claimed in claim 6, wherein, rendering of the first audio and/or visual object changes the rendering for the first sub-set of users from rendering the audio and/or visual content at a default position to rendering the audio and/or visual content at a non-default position.

10. A method as claimed in claim 1, wherein rendering of the first audio and/or visual object to the first sub-set of users does not indicate to the first sub-set of users that the message is targeted to them and wherein rendering of the second audio and/or visual object to the second sub-set of users does indicate to the second sub-set of users that the message is not targeted to them.

11. A method as claimed in claim 10, wherein rendering of the second audio and/or visual object to the second sub-set of users indicates to the second sub-set of users that the message is targeted to the first sub-set of users and provides an indication of the members of the first sub-set of users.

12. A method as claimed in claim 10, wherein spatial rendering of the first audio object to the first sub-set of users renders the audio and/or visual content of the message at a default position and wherein spatial rendering of the second audio and/or visual object to the second sub-set of users renders the audio and/or visual content of the message at a non-default position.

13. A method as claimed in claim 1, further comprising:
   causing disambiguation of the message from other simultaneously rendered messages by preventing overlapping of the message and the other messages in space and time by providing at least a minimum spatial separation between simultaneously rendered messages in the virtual three-dimensional space.

14. A method as claimed in claim 1, wherein the second position corresponds to a position of the first user in the virtual three-dimensional space, and wherein the first position is closer than the second position to a position in the virtual three-dimensional space of at least one of the users in the first sub-set.

15. A method as claimed in claim 1, wherein the first position corresponds to a position of the first user in the virtual three-dimensional space, and wherein the second position corresponds to a position of at least one of the users in the second sub-set.

16. An apparatus comprising
at least one processor; and
at least one memory including computer program code;
the at least one memory and the computer program code configured to, with the at least one processor, cause the apparatus at least to perform:
   determining that a message comprising audio and/or visual content, from a first user in a virtual three-dimensional space, is targeted to a first sub-set of users in the virtual three-dimensional space, wherein the message is not targeted to a second sub-set of users in the virtual three-dimensional space;
   determining a first audio and/or visual object and a second audio and/or visual object, wherein the first audio and/or visual object comprises the audio and/or visual content of the message and one or more first values for one or more first spatial rendering parameters, and the second audio and/or visual object comprises the audio and/or visual content of the message and one or more second values for one or more second spatial rendering parameters;
   causing the first audio and/or visual object to be rendered to the first sub-set of users based on the first values such that the audio and/or visual content is rendered at a first position in the virtual three-dimensional space; and
   causing the second audio and/or visual object to be rendered to the second sub-set of users based on the one or more second values such that the audio and/or visual content is rendered at a different, second position in the virtual three-dimensional space.

17. The apparatus of claim 16, wherein at least one of:
the audio and/or visual content comprises audio content to be rendered within a sound space of the virtual three-dimensional space based on the respective first audio and/or visual object and the second audio and/or visual object; and
the audio and/or visual content comprises, visual content to be rendered within a visual space of the virtual three-dimensional space based on the respective first audio and/or visual object and the second audio and/or visual object.

18. The apparatus of claim 16, wherein at least one of the first values and at least one of the second values are different values for a same spatial rendering parameter, wherein the same spatial rendering parameter corresponds to at least one of: two-dimensional orientation, elevation, distance and spatial extent.

19. The apparatus of claim 16, wherein causing the first audio and/or visual object to be rendered to the first sub-set of users and the second audio and/or visual object to be rendered to the second sub-set of users provides indirect selective communication to the users via the first values and the second values, separate to any content of the message.

20. A non-transitory computer readable medium comprising computer program code stored thereon, the computer readable medium and computer program code being configured to, when run on at least one processor, perform at least the following:
   determining that a message comprising audio and/or visual content, from a first user in a virtual three-dimensional space, is targeted to a first sub-set of users in the virtual three-dimensional space, wherein the message is not targeted to a second sub-set of users in the virtual three-dimensional space;
   determining a first audio and/or visual object and a second audio and/or visual object, wherein the first audio and/or visual object comprises the audio and/or visual content of the message and one or more first values for one or more first spatial rendering parameters, and the second audio and/or visual, object comprises the audio and/or visual content of the message and one or more second values for one or more second spatial rendering parameters;
   causing the first audio and/or visual object to be rendered to the first sub-set of users based on the first values such that the audio and/or visual content is rendered at a first position in the virtual three-dimensional space; and
   causing the second audio and/or visual object to be rendered to the second sub-set of users based on the one or more second values such that the audio and/or visual content is rendered at a different, second position in the virtual three-dimensional space.

* * * * *